United States Patent [19]

Craemer et al.

[11] Patent Number: 4,780,834

[45] Date of Patent: Oct. 25, 1988

[54] APPARATUS FOR MEASURING MASS THROUGHPUT OF A FLUID MOVED IN A CHANNEL

[75] Inventors: Bernhard Craemer, Bergisch-Gladbach; Ralf Wehrlein, Bochum; Josef Lambrecht, Cologne, all of Fed. Rep. of Germany

[73] Assignee: Interatom GmbH, Bergisch Gladbach, Fed. Rep. of Germany

[21] Appl. No.: 850,264

[22] Filed: Apr. 10, 1986

[30] Foreign Application Priority Data

Apr. 11, 1985 [DE] Fed. Rep. of Germany ....... 3513037

[51] Int. Cl.[4] .................... G01F 1/86; G01F 15/46
[52] U.S. Cl. .................... 364/510; 73/861.02; 73/861.03; 376/246
[58] Field of Search ........... 364/510, 558, 550; 340/611; 73/861.02, 861.03, 861.42, 168; 376/246

[56] References Cited

U.S. PATENT DOCUMENTS

| | | | |
|---|---|---|---|
| 3,430,489 | 3/1969 | Pfrehm | 73/861.03 |
| 3,739,159 | 6/1973 | Nalley | 364/510 |
| 4,419,898 | 12/1983 | Zanker et al. | 364/510 |
| 4,450,715 | 5/1984 | Sumal | 364/510 |
| 4,467,657 | 8/1984 | Olsson | 73/861 |

OTHER PUBLICATIONS

Publication "Control and Instrumentation" vol. 9, No. 1, Jan. 1976, pp. 32-35.

Publication "Machine Design" vol. 45, No. 24, Oct. 1973, p. 42.

*Primary Examiner*—Parshotam S. Lall
*Assistant Examiner*—David C. Goldman
*Attorney, Agent, or Firm*—Herbert L. Lerner; Laurence A. Greenberg

[57] ABSTRACT

An apparatus for measuring and indicating mass throughput of a fluid moved in a channel by a processing machine includes first to fourth measurement value pickups, first to third divider stages, first to fourth resistances, first to fifth multiplier stages, an adder for forming a difference $$f = 1 - \alpha_1 \frac{\Delta p}{p_1}$$

between an output signal of the first divider stage which is weighted with the first resistance, a memory of characteristics of the processing machine which has stored therein an appertaining volume number as a function of a magnitude of an output of the second divider stage and of the fourth measurement value pickup, and a measurement value indicator for indicating an output of the third divider stage weighted by the fourth resistance which is the mass throughput $$\dot{m} = \frac{\psi \times \eta_G \times p_1 \times \alpha_3}{T_1}.$$

3 Claims, 1 Drawing Sheet

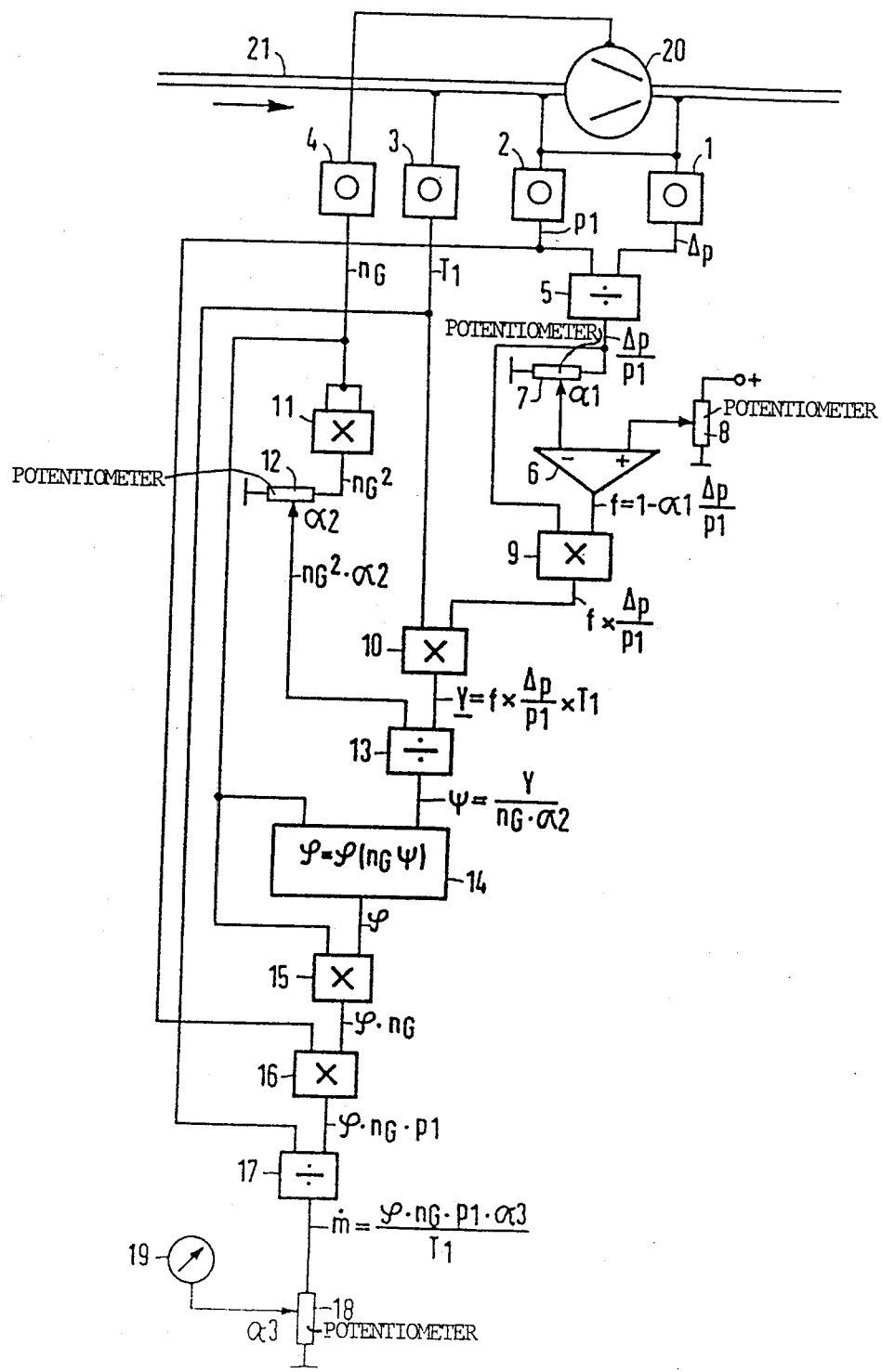

APPARATUS FOR MEASURING MASS THROUGHPUT OF A FLUID MOVED IN A CHANNEL

BACKGROUND OF THE INVENTION

Field of the Invention

The invention relates to apparatus for measuring mass throughput of a fluid which is being moved in a channel by a processing machine, wherein the term "processing machine" is meant to include such equipment generally referred to as pumps which are used for circulating liquids as well as blowers which are used for circulating gases. In principle, the apparatus of the instant application and the method of operation thereof are applicable to all types of fluids and to a multiplicity of machines or installations, but the invention is described hereinafter with respect to a specific practical application and, more particularly, by way of example, with respect to a gas-cooled high-temperature nuclear reactor such as has been described, for example, in European Pat. No. (EP-B) 0 036 166.

One of the most important values or parameters which is used for monitoring and controlling such a reactor (as well as many other systems) is the mass throughput of the coolant. If conventional measuring devices are used for this purpose, suitable orifices or restrictors, for example, must be arranged in the fluid stream or flow which cause an additional pressure loss, or relatively long inlet and outlet sections are required which are located upstream of and downstream of the measuring equipment; the realization of such devices in the aforementioned nuclear reactor has not been possible heretofore, taking into consideration desired efficiency, accessibility and crowded spatial conditions.

It is accordingly an object of the invention to provide an apparatus for measuring mass throughput of a fluid which is being moved in a channel without having to resort to such aids and which can also be used without alteration for different system pressures.

It is further an object of the invention, in the specific case of the aforementioned high-temperature nuclear reactor, to provide such apparatus which permits the greatest possible use to be made of measuring devices which are already available for other reasons, so that it is possible to limit the additional expense to that for providing a circuit for evaluating measurement values which are already available.

SUMMARY OF THE INVENTION

With the foregoing and other objects in view, there is provided, in accordance with the invention, an apparatus for measuring mass throughput m of a fluid moved in a channel by a processing machine, comprising:

(a) a first measurement value pickup for determining the difference pressure $\Delta p$ between suction and output sides of the processing machine;

(b) a second measurement value pickup for determining a pressure $p_1$ prevailing on the suction side of the processing machine;

(c) a third measurement value pickup for determining a fluid temperature $T_1$ on the suction side of the processing machine;

(d) a fourth measurement value pickup for determining a speed $n_G$ of the processing machine;

(e) a first divider stage for forming a quotient $\Delta p/p_1$ from outputs of the first and the second measurement value pickups;

(f) a first resistance which is proportional to one-half of a reciprocal value $\alpha_1 = \frac{1}{2}k$ of an isentropy exponent of the fluid to be measured;

(g) a second resistance which corresponds to a maximum output signal of one of the measurement value pickups;

(h) an adder for forming a difference $$f = 1 - \alpha_1 \frac{\Delta p}{p_1}$$

between an output signal of the second resistance and an output signal of the first divider stage which is weighted with the first resistance;

(i) a first multiplier stage for forming a product $$f \times \frac{\Delta p}{p_1}$$

from outputs of the adder and the first divider stage;

(j) a second multiplier stage for forming a product $$Y = f \times \frac{\Delta p}{p_1} \times T_1$$

from outputs of the first multiplier stage and the third measurement value pickup;

(k) a third multiplier stage for squaring an output of the fourth measurement value pickup to form an output value $n_G^2$;

(l) a third resistance which is proportional to the square of a rotor circumference $$\alpha_2 = \frac{\pi^2 D^2}{2R}$$

of the processing machine divided by twice the fluid constant;

(m) a second divider stage for forming a quotient $$\psi \text{ (a pressure number)} = \frac{Y}{n_G^2 \times \alpha_2}$$

from the outputs of the second multiplier stage and the output of the third multiplier stage weighted with the third resistance;

(n) a memory of characteristics of the processing machine which furnishes an appertaining volume number as a function of a magnitude of an output of the second divider stage and of the fourth measurement value pickup;

(o) a fourth multiplier stage for forming a product $\phi \times n_G$ of outputs of the memory of characteristics of the processing machine and the fourth measurement value pickup;

(p) a fifth multiplier stage for forming a product $\phi \times n_G \times p_1$ from outputs of the fourth multiplier stage and the second measurement value pickup;

(q) a third divider stage for forming a quotient $$\frac{\phi \times n_G \times p_1}{T_1}$$

from outputs of the fifth multiplier stage and the third measurement value pickup;

(r) a fourth resistance which is proportional to a product of a cube of the outside diameter of the rotor of the processing machine and a square of $\pi$ divided by four-times the fluid constant and has a value $$\alpha_3 = \frac{\pi^2 D^3}{4R};$$

and (s) a measurement value indicator for indicating an output of the third divider stage weighted by the fourth resistance, which is the mass throughput $$\dot{m} = \frac{\phi \times \eta_G \times p_1 \times \alpha_3}{T_1}$$

It is sufficient only to measure four process variables continuously, namely, the pressure present at the suction side of the processing machine, the pressure difference generated across the processing machine, the fluid temperature at the suction side of the processing machine as well as the rotary speed of the processing machine. The characteristics of the processing machine are commonly also available from the manufacturer or other sources and are stored in a memory module, divided into a number of discrete values which are required, depending upon the desired measuring accuracy; this is done in a dimensionless presentation in which the volume number $\phi$ is a function of the pressure number $\psi$. Furthermore, constants enter into the calculation which are determined in accordance with the properties of the fluids to be measured and the geometric conditions of the processing machine.

In a particular embodiment of the invention, the constants represented in the circuit by resistances of given values are so adjustable that a change in the properties of the fluids to be measured can be conformed with.

In accordance with another feature of the invention, the first, second, third and fourth resistances are variable.

In accordance with a concomitant feature of the invention, the apparatus is in combination with a gas-cooled high-temperature nuclear reactor for measuring mass flow of the cooling gas.

Other features which are considered as characteristic for the invention are set forth in the appended claims.

Although the invention is illustrated and described herein as embodied in an apparatus for measuring mass throughput of a fluid moved in a channel, it is nevertheless not intended to be limited to the details shown, since various modifications and structural changes may be made therein without departing from the spirit of the invention and within the scope and range of equivalents of the claims.

BRIEF DESCRIPTION OF THE INVENTION

The construction and method of operation of the invention, however, together with additional objects and advantages thereof will be best understood from the following description of specific embodiments when read in connection with the accompanying single FIGURE of the drawing which is a schematic view of apparatus for measuring the mass throughput or rate of flow of a fluid moved in a channel.

DESCRIPTION OF THE PREFERRED EMBODIMENT

Referring now to the drawing, there is shown therein, a channel 21 wherein a fluid such as, helium used for cooling a high-temperature nuclear reactor, is moved, in a direction represented by the arrow, by means of a processing machine 20, such as a blower, for example.

A first measurement value pickup 1 serves for determining a pressure difference $\Delta p$ in the fluid caused by the processing machine 20. A second measuring value pickup 2 measures a pressure $p_1$ existing at the suction side of the processing machine 20, and a third measurement value pickup 3 measures the fluid temperature $T_1$ also existing at that suction side. In addition, a fourth measurement value pickup 4 is provided which measures the rotary speed $n_G$ of the processing machine 20. The measurement value pickups 1 to 4 furnished impressed current signals, in the range from 0 to 20 mA, in this case, which are converted, in the case at hand, into voltage signals, for example in the range of 0 to 10 V before being processed further by means of non-illustrated converters. In a first divider stage 5, the quotient of the pressure difference $\Delta p$ and the pressure $p_1$ on the suction side is first determined and, weighted with a constant $\alpha_1$, fed to one input of an adder 6; the constant $\alpha_1$, represented in this instance by a potentiometer 7, corresponds to one-half the reciprocal value $\frac{1}{2}k$ of the isentropy exponent of the fluid to be measured. The other input of the adder 6 is tied to a second potentiometer 8 which corresponds to the maximum output signal of one of the measurement value pickups 1 to 4 and furnishes the value 1 from which the weighted quotient from the pressure difference and the starting pressure is subtracted. A correction factor f thus obtained compensates for compressibility changes to which the fluid is subjected in passing through the processing machine. The correction factor thus obtained is multiplied in a first multiplier 9 again by the aforementioned quotient and, together with the temperature signal $T_1$, is fed to a second multiplier 10 which furnishes a value $$y = \frac{f \times \Delta p}{p_1 \times t_1}.$$

This signal in turn supplies one input of a second divider stage 13. The other input of the second divider stage 13 is addressed by a value which is obtained by a squaring of the signal $n_G$ corresponding to the speed, which is performed in a third multiplier 11, and a subsequent weighting thereof by a second constant $\alpha_2$ presented by a third potentiometer 12 and corresponding to the square of the circumference of the processing-machine rotor divided by twice the gas constant. The second divider stage then furnishes the pressure number $\psi$. The value of the volume number $\phi$ corresponding to this pressure number and the prevailing speed $n_G$ is called up from a memory module 14 and fed to a fourth multiplier 15 and is multiplied thereat again by the rotary speed. The value $\phi \times n_G$ is multiplied in a fifth multiplier 16 by the pressure $p_1$ and finally divided in a third divider 17 by the temperature. The result, weighted with a third constant $\alpha_3$ provided by a fourth potentiometer 18, is displayed by a voltmeter 19 where the constant $\alpha_3$ corresponds to the product of the cube of the rotor diameter of the processing machine and the square of $\pi$, divided by four-times the gas constant. In the event of changes in the physical properties of the fluid to be measured, for example, in case of changes of the medium flowing in the channel 21, the apparatus can be adapted to the new situation by settings of the potentiometers 7, 8, 12, 18, changed in accordance with the changes of the isentropy exponents and the gas constant, respectively. It will present no difficulty to an expert to adapt this apparatus to applications in which larger compression ratios occur.

The foregoing is a description corresponding in substance to German Application No. P 35 13 037.7, dated Apr. 11, 1985, the International priority of which is being claimed for the instant application, and which is hereby made part of this application. Any material discrepancies between the foregoing specification and the aforementioned corresponding German application are to be resolved in favor of the latter.

What is claimed is:

1. Apparatus for measuring and indicating mass throughput m of a fluid moved in a channel by a processing machine, comprising:
   (a) a first measurement value pickup for determining the difference pressure $\Delta p$ between suction and output sides of the processing machine;
   (b) a second measurement value pickup for determining a pressure $p_1$ prevailing on said suction side of the processing machine;
   (c) a third measurement value pickup for determining a fluid temperature $T_1$ on said suction side of the processing machine;
   (d) a fourth measurement value pickup for determining a speed $n_G$ of the processing machine;
   (e) a first divider stage for forming a quotient $\Delta p/p_1$ from outputs of said first and said second measurement value pickups;
   (f) a first resistance which is proportional to one-half of a reciprocal value $\alpha_1 = \frac{1}{2}k$ of an isentropy exponent of the fluid to be measured;
   (g) a second resistance which corresponds to a maximum output signal of one of said measurement value pickups;
   (h) an adder for forming a difference $$f = 1 - \alpha_1 \frac{\Delta p}{p_1}$$

between an output signal of said second resistance and an output signal of said first divider stage which is weighted with said first resistance;
   (i) a first multiplier stage for forming a product $$f \times \frac{\Delta p}{p_1}$$

from outputs of said adder and said first divider stage;
   (j) a second multiplier stage for forming a product $$Y = f \times \frac{\Delta p}{p_1} \times T_1$$

from outputs of said first multiplier stage and said third measurement value pickup;
   (k) a third multiplier stage for squaring an output of said fourth measurement value pickup to form an output value $n_G^2$;
   (l) a third resistance value is proportional to a rotor circumference $$\alpha_3 = \frac{\pi^2 D^2}{2R}$$

of the processing machine squared and divided by twice a fluid constant;
   (m) a second divider stage for forming a quotient $$\psi \text{ (a pressure number)} = \frac{Y}{n_G^2 \times \alpha_2}$$

from the outputs of said second multiplier stage and said output of said third multiplier stage weighted with said third resistance;
   (n) a memory of characteristics of the processing machine which has stored therein an appertaining volume number as a function of a magnitude of an output of said second divider stage and of said fourth measurement value pickup;
   (o) a fourth multiplier stage for forming a product $\phi \times n_G$ of outputs of said memory of characteristics of the processing machine and said fourth measurement value pickup wherein $\phi$ is a volume number corresponding to said pressure number $\psi$;
   (p) a fifth multiplier stage for forming a product $\phi \times n_G \times p_1$ from outputs of said fourth multiplier stage and said second measurement value pickup;
   (q) a third divider stage for forming a quotient $$\frac{\phi \times n_G \times p_1}{T_1}$$

from outputs of said fifth multiplier stage and said third measurement value pickup;
   (r) a fourth resistance which is proportional to a product of a cube of a outside diameter of the rotor of the processing machine and a square of $\pi$ divided by four-times the fluid constant and has a value $$\alpha_4 = \frac{\pi^2 D^3}{4R} ;$$

and
   (s) a measurement value indicator for indicating an output of said third divider stage weighted by said fourth resistance, which is the mass throughput $$\dot{m} = \frac{\psi \times n_G \times p_1 \times \alpha_3}{T_1} .$$

2. Apparatus according to claim 1, wherein said first, second, third and fourth resistances are variable.

3. Apparatus according to claim 1 in combination with a gas-cooled high-temperature nuclear reactor for measuring mass flow of the cooling gas.

* * * * *